United States Patent
Maheshwary et al.

(10) Patent No.: US 6,524,370 B2
(45) Date of Patent: Feb. 25, 2003

(54) OXYGEN PRODUCTION

(75) Inventors: Apurva Maheshwary, Nutley, NJ (US); Baechen Benson Wang, Livingston, NJ (US); John Robert Ambriano, Monmouth Beach, NJ (US); Timothy P. Thomson, Allentown, PA (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 09/882,388

(22) Filed: Jun. 15, 2001

(65) Prior Publication Data

US 2002/0017191 A1 Feb. 14, 2002

Related U.S. Application Data

(60) Provisional application No. 60/221,311, filed on Jul. 28, 2000.

(51) Int. Cl.[7] .................................. B01D 53/053
(52) U.S. Cl. ........................ 95/101; 95/102; 95/103; 95/105; 95/130
(58) Field of Search ........................ 95/96–98, 100–103, 95/105, 130, 138

(56) References Cited

U.S. PATENT DOCUMENTS

| | | | |
|---|---|---|---|
| 4,810,265 A | * 3/1989 | Lagree et al. | 95/130 X |
| 5,002,591 A | * 3/1991 | Stanford | 95/130 X |
| 5,122,164 A | 6/1992 | Hirooka et al. | 55/26 |
| 5,330,561 A | 7/1994 | Kumar et al. | 95/101 |
| 5,411,578 A | 5/1995 | Watson et al. | 95/101 |
| 5,529,610 A | 6/1996 | Watson et al. | 95/100 |
| 5,536,299 A | * 7/1996 | Girard et al. | 95/101 |
| 5,540,758 A | * 7/1996 | Agrawal et al. | 95/101 |
| 5,549,733 A | * 8/1996 | Marot et al. | 95/130 X |
| 5,565,018 A | * 10/1996 | Baksh et al. | 95/130 X |
| 5,656,068 A | 8/1997 | Smolarek et al. | 95/101 |
| 5,702,504 A | * 12/1997 | Schaub et al. | 95/130 X |
| 5,711,787 A | * 1/1998 | Neill et al. | 95/96 |
| 5,755,856 A | * 5/1998 | Miyake et al. | 95/101 |
| 5,846,294 A | 12/1998 | Doong | 95/98 |
| 5,906,674 A | * 5/1999 | Tan et al. | 95/98 |
| 5,968,233 A | * 10/1999 | Rouge et al. | 95/130 X |
| 6,048,384 A | * 4/2000 | Smolarek | 95/130 X |
| 6,171,371 B1 | * 1/2001 | Derive et al. | 95/98 |
| 6,287,366 B1 | * 9/2001 | Derive et al. | 95/100 |

* cited by examiner

*Primary Examiner*—Robert H. Spitzer
(74) *Attorney, Agent, or Firm*—Philip H. Von Neida; Salvatore P. Pace

(57) ABSTRACT

A two bed vacuum swing adsorption process for the production of oxygen is disclosed. Efficient use of air blowers and vacuum pumps maximizes the machine utilization and product gas purges in low flow and high flow modes to increase productivity while lessening power consumption.

16 Claims, 2 Drawing Sheets

OXYGEN PRODUCTION

This application claims priority from Provisional Patent Application Serial No. 60/221,311, filed Jul. 28, 2000.

FIELD OF THE INVENTION

The present invention relates to an improved process for producing oxygen in a two bed vacuum swing adsorption (VSA) gas separation process.

BACKGROUND OF THE INVENTION

Cyclic adsorption processes are frequently used to separate the components of a gas mixture. Typically, cyclic adsorption processes are conducted in one or more adsorbent vessels that are packed with a particulate adsorbent material which adsorbs at least one gaseous component of the gas mixture more strongly than it adsorbs at least one other component of the mixture. The adsorption process comprises repeatedly performing a series of steps, the specific steps of the sequence depending upon the particular cyclic adsorption process being carried out.

In any cyclic adsorption process, the adsorbent bed has a finite capacity to adsorb a given gaseous component and, therefore, the adsorbent requires periodic regeneration to restore its adsorption capacity. The procedure followed for regenerating the adsorbent varies according to the process. In VSA processes, the adsorbent is at least partially regenerated by creating vacuum in the adsorption vessel, thereby causing adsorbed component to be desorbed from the adsorbent, whereas in PSA processes, the adsorbent is regenerated at atmospheric pressure. In both VSA and PSA processes, the adsorption step is carried out at a pressure higher than the desorption or regeneration pressure.

A typical VSA process generally comprises of a series of four basic steps that includes (i) pressurization of the bed to the required pressure, (ii) production of the product gas at required purity, (iii) evacuation of the bed to a certain minimum pressure, and (iv) purging the bed with product gas under vacuum conditions. In addition a pressure equalization or bed balance step may also be present. This step basically minimizes vent losses and helps in improving process efficiency. The PSA process is similar but differs in that the bed is depressurized to atmospheric pressure and then purged with product gas at atmospheric pressure.

As mentioned above, the regeneration process includes a purge step during which a gas stream that is depleted in the component to be desorbed is passed countercurrently through the bed of adsorbent, thereby reducing the partial pressure of adsorbed component in the adsorption vessel which causes additional adsorbed component to be desorbed from the adsorbent. The nonadsorbed gas product may be used to purge the adsorbent beds since this gas is usually quite depleted in the adsorbed component of the feed gas mixture. It often requires a considerable quantity of purge gas to adequately regenerate the adsorbent. For example, it is not unusual to use half of the nonadsorbed product gas produced during the previous production step to restore the adsorbent to the desired extent. The purge gas requirement in both VSA and PSA processes are optimization parameters and depend on the specific design of the plant and within the purview of one having ordinary skill in the art of gas separation.

Many process improvements have been made to this simple cycle design in order to reduce power consumption, improve product recovery and purity, and increase product flow rate. These have included multi-bed processes, single-column rapid pressure swing adsorption and, more recently, piston-driven rapid pressure swing adsorption and radial flow rapid pressure swing adsorption. The trend toward shorter cycle times is driven by the desire to design more compact processes with lower capital costs and lower power requirements. The objective has been to develop an adsorbent configuration that demonstrates an ability to produce the required purity of oxygen, with minimum power consumption and lower capital costs.

SUMMARY OF THE INVENTION

The present invention provides for a process for separating oxygen from nitrogen utilizing a vacuum swing adsorption process. The process utilizes two beds, an air blower, a vacuum pump and a product reservoir. The process employs ambient air to pressurize a bed while the bed pressure is lower than atmospheric pressure. The process depressurizes a bed to atmosphere while the bed pressure is higher than ambient pressure. The process also employs a two step bed purge using the product gas. The process maximizes the air blower and the vacuum pump utilization to achieve higher productivity and lower power consumption.

In a first embodiment of the invention, the two bed cycle is a process for selectively separating oxygen from a gas stream in two adsorbent beds containing an adsorbent selective for nitrogen and a product reservoir. The process comprises the following five steps:

(a) An air stream is added to the first bed with an air blower and/or ambient air. The first bed being at a lower pressure from the previous cycle also receives oxygen product gas from the second bed. The second bed is at a higher pressure from the same previous cycle and is regenerated by removing waste gas through a vacuum pump.

(b) The air stream is added to the first bed with the air blower while the waste stream is removed from the second bed with the vacuum pump.

(c) The oxygen product is withdrawn from the first bed while air is still being added to it with the air blower. The waste stream is still being removed from the second bed with the vacuum pump.

(d) A portion of the oxygen product withdrawn from the first bed is diverted from the product reservoir to the second bed while the air blower is adding air to the first bed and the waste stream is being removed from the second bed with the vacuum pump.

(e) The oxygen product from the first bed is fully diverted from the product reservoir to the second bed. The first bed is also being depressurized to atmosphere while the air blower discharge pressure is ramped down. The waste stream is removed from the second bed via the vacuum pump.

(f) Repeat steps (a) through (e) by reversing the operating modes of the first bed and second bed so that the second bed will be the production bed and the first bed the regeneration bed.

The present inventors anticipate that this inventive process will not only be useful in vacuum swing adsorption (VSA) processes but also pressure swing adsorption (PSA) processes as well.

The nitrogen adsorbent material is any adsorbent that is capable of preferentially adsorbing nitrogen over oxygen. Examples include zeolite, such as zeolite X, molecular adsorption sieves. Preferably the zeolite X sieve is a lithium ion-exchanged type X zeolite, having a silicon to aluminum atomic ratio in the zeolite lattice of between 0.9 and 1.1. Preferably, this range is from 1.0 to 1.1 with a ratio of silicon to aluminum less than 1.08 most preferred for the type X zeolite. Of the available exchangeable cation sites on the type X zeolite, preferably at least 50% are occupied by ions from Groups 1A, 1B, 2A, 2B or mixtures of these. Of these groups, sodium, lithium, potassium, silver(I), calcium, strontium and mixtures of these are the most preferred cations. The type X zeolite may also be comprised of lithium or lithium and bivalent cation or lithium and a trivalent cation. Preferably about 50% to about 95% of the available exchangeable sites are occupied by lithium ions and about 50 to 5% are occupied by (a) divalent cations selected from the group consisting of calcium ions, strontium ions, magnesium ions, barium ions, zinc ions, copper (II) ions and mixtures of these, (b) trivalent ions selected from the group consisting of aluminum, scandium, gallium, iron (II), chromium (III), indium, yttrium, single lanthanides, mixtures of two or more lanthanides and mixtures of these or (c) combinations of (a) and (b).

The air stream that is treated may contain oxygen and nitrogen in any proportion but preferably is about 21% oxygen and 79% nitrogen.

Typical operating conditions for this process are maximum feed pressures greater than 1013 millibar and minimum vacuum pressures of up to 260 millibar or higher. Partial cycle times of between of about 10 to 60 seconds are typically employed in a VSA cycle. Typical operating conditions for PSA are feed pressure up to 3 bara with a cycle time of between about 5 to 60 seconds.

DETAILED DESCRIPTION OF THE INVENTION

A process for separating oxygen from air is described. The present invention comprises a process for selectively separating oxygen from air in two adsorbent beds containing an adsorbent selective for nitrogen and a product reservoir comprising the steps of:
(a) adding said air stream to the first bed with an air blower while receiving oxygen from the second bed whereby said second bed is being regenerated by removing waste stream with a vacuum pump;
(b) continue adding said air stream to said first bed and withdrawing said waste stream from said second bed;
(c) withdrawing oxygen product from said first bed to said product reservoir while continuing to add said air stream to said first bed and withdrawing said waste stream from said second bed;
(d) diverting a portion of said oxygen product being withdrawn from said first bed to said second bed while continuing to add said air stream to said first bed and remove said waste stream from said second bed;
(e) diverting entirely said oxygen product to said second bed while depressurizing said first bed by ramping down the discharge pressure of said air blower and continuing to remove said waste stream from said second bed;
(f) repeating steps (a) through (e) whereby said first bed and said second bed are reversed.

In this embodiment of the invention the vacuum swing adsorption (VSA) cycle is carried out in ten steps for each complete cycle. In step 1 air is used as the feed gas to the first adsorbent bed while in steps 2 and 3 gas is passed through the second column thereby regenerating the adsorbent bed.

In step 4, the oxygen withdrawn from the first bed is passed to a product reservoir. In steps 5 and 6, the oxygen is diverted partially from the product reservoir such that it will enter the inlet of the second bed at increased pressure while purge gas is continuously pulled through the second bed. Lastly, the complete flow of product oxygen gas is diverted from the product reservoir and passed entirely through the second adsorbent bed while the pump continues passing purge gas through the bed. The air blower can be of any type commercially available as well as the vacuum pump which can be a one or two stage pump.

Figure 1:
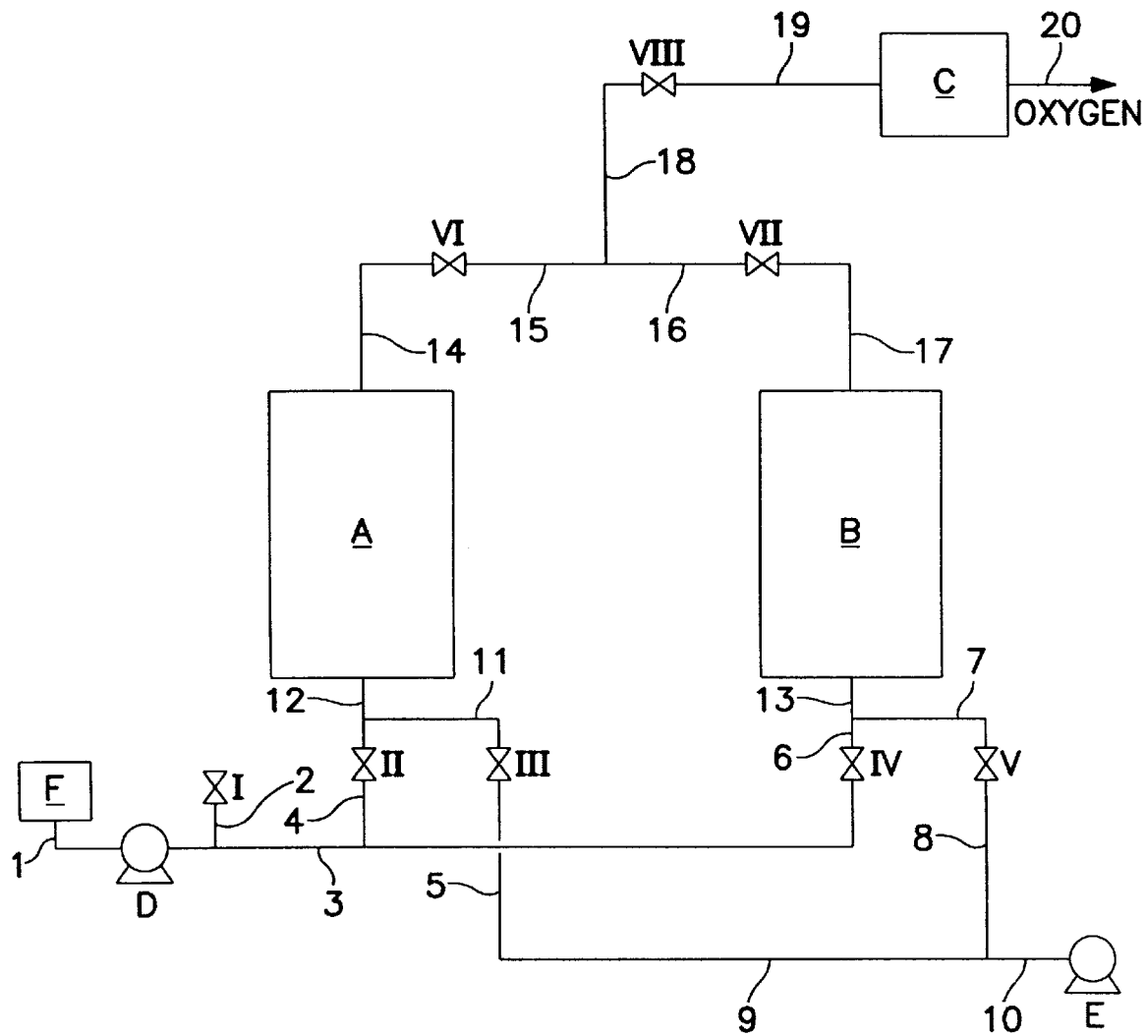
FIG. 1 is a schematic flow diagram of the present invention.
Figure 2:
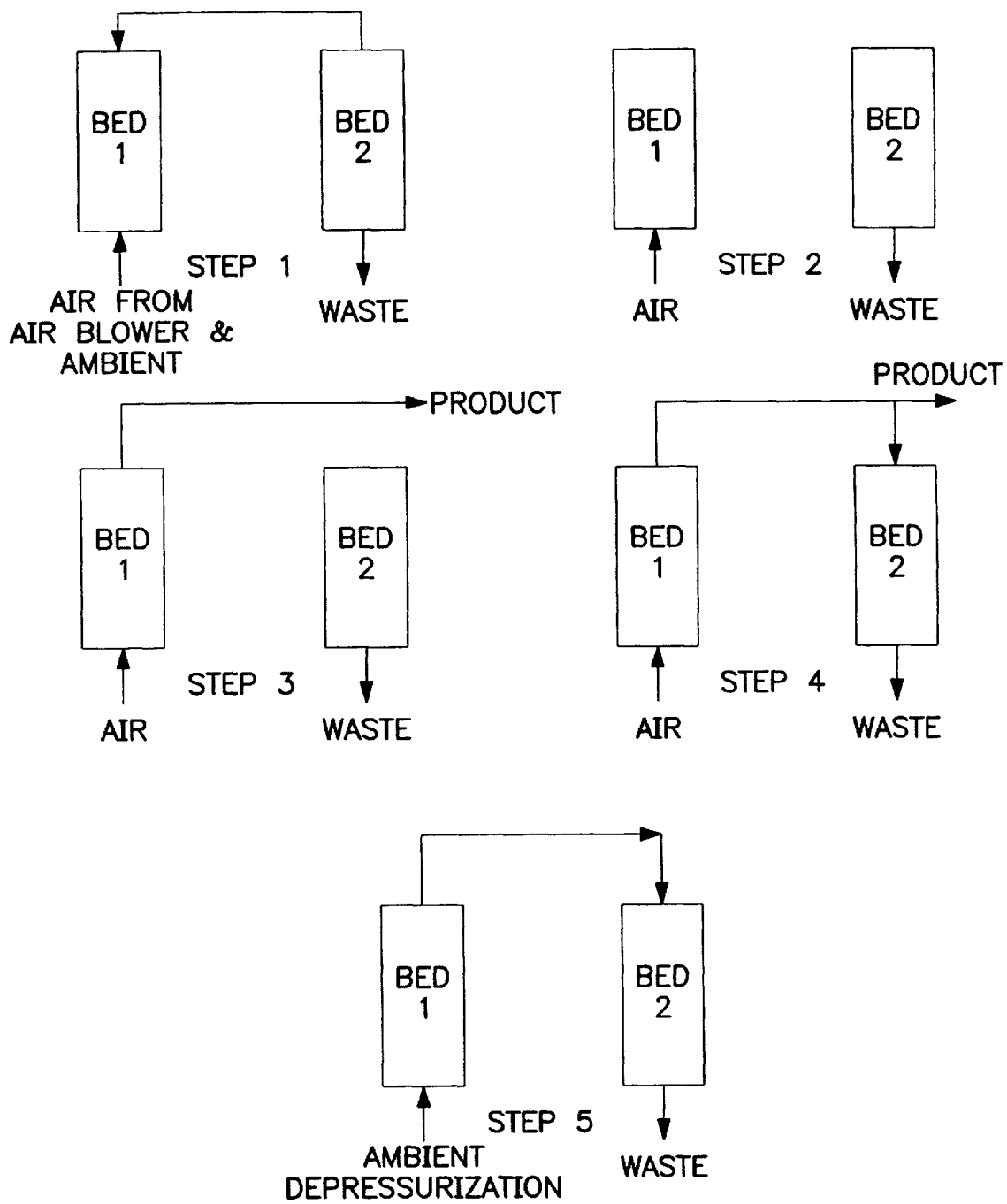
FIG. 2 illustrates various steps in the cycle of the present invention.

Now to the figures, FIG. 1, in particular, there is shown a system for producing an enriched oxygen gas stream from a gas containing oxygen and nitrogen, such as air. Each of the two adsorption columns A and B contains an adsorbent capable of adsorbing nitrogen.

The cycle description below begins with the bed A on the pressurization mode and bed B on regeneration mode. The pressurization is done by an air blower D and the regeneration is done by a vacuum pump E. The product reservoir C is designed to receive and hold the enriched oxygen gas from the process to maintain a constant flow of oxygen out of the VSA plant In step 1, an air blower D receives air from a source F through line 1 and directs air through open valve II into bed A through inlet line 12. The air unload valve I during this step is open to atmosphere to allow the ambient air to enter the adsorber along with the feed air from the air blower D through line 2. The product gas from the bed B, which is at a higher pressure will be used to equalize the pressure between the two beds. This product gas is directed through line 17, valve VII, line 16, line 15, valve VI and line 14 to the adsorber bed A. The vacuum pump E which was evacuating bed A through line II to valve III and through line 9 to line 10, in the previous part cycle will be switched to bed B. This vacuum pump shall remove waste gas from the bed B through line 13, line 7, valve V, line 8 and line 10. When bed B is being pressurized, the air from air blower D flows through lines 3 and 5 to valve IV and through lines 6 and 13 into bed B.

In step 2, the air blower will continue to direct air into bed A through valve II and inlet line 12. The vacuum pump E shall continue removing the waste gas from bed B through line 13, line 7, valve V, line 8 and line 10.

In step 3, the product gas shall be withdrawn from bed A through line 14, valve VI, line 15, line 18, valve VIII and line 19 directed into the product receiver tank C. From there, the product gas is removed from the plant through line 20. During this step the air blower will continue to direct air into bed A through valve II and inlet line 12. The vacuum pump E shall continue removing the waste gas from bed B through line 13, line 7, valve V, line 8 and line 10.

In step 4, a part of the product gas shall be diverted into bed B through line 16, valve VII and line 17. Valve VII is only partially opened during this step, to control the amount of gas being transferred to bed B. This slip stream to bed B will be referred to as the purge gas. The other stream of the product gas will continue to flow into the product receiver tank C through line 18, valve VIII and line 19. During this step the air blower will continue to direct air into bed A through valve II and inlet line 12. The vacuum pump E shall continue removing the waste gas from bed B through line 13, line 7, valve V, line 8 and line 10.

In step 5, the product flow to the product receiver tank C will be stopped. The entire product gas from bed A shall be diverted to the bed B through line 14, valve VI, line 15, line 16, valve VII and line 17. The valve I shall be ramped to a partially opened position. This will gradually divert the gas from the air blower through line 2 and valve I to atmosphere. This will also cause the waste gas from the bed A bottom to be diverted to atmosphere through line 12, valve II, line 4, line 3, line 2 and valve I. The vacuum pump E shall continue removing the waste gas from bed B through line 13, line 7, valve V, line 8 and line 10. In step 5, the instantaneous purge gas flow rate will be about 100% to 300% and preferably about 150% to 200% of the averaged gas production flow rate from the plant.

After step 5 the air blower shall switch from bed A to bed B and vacuum pump will switch from bed B to bed A. All the steps given in sequence above shall be repeated with bed A in regeneration mode and bed B on pressurization mode.

As such, the regeneration of the adsorbent beds is achieved using both vacuum pump and product gas purges in low flow and high flow rate modes. This further eliminates machine idle steps as the blower and vacuum pump contribute throughout the cycle. Additionally, using the ambient air repressurization and ambient air depressurization contributes overall efficiency to the process.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

Having thus described the invention, what we claim is:

1. A process for selectively separating oxygen from a gas mixture containing oxygen and nitrogen in two adsorbent beds containing an adsorbent selective for nitrogen and a product reservoir comprising the steps of:

(a) adding an air stream to the first bed with an air blower with or without ambient air while receiving oxygen from the second bed which is being regenerated by removing waste gas with a vacuum pump;

(b) adding the air stream to said first bed with said air blower while removing the waste stream from said second bed with said vacuum pump;

(c) withdrawing oxygen product from said first bed to the product reservoir while the air stream is being added to said first bed and said waste stream from said second bed is being removed with said vacuum pump;

(d) diverting a portion of the oxygen product being withdrawn from said first bed to said second bed while continuing to add air to said first bed with said air blower and removing said waste stream from said second bed with said vacuum pump;

(e) diverting entirely the oxygen product being withdrawn from said first bed to said second bed while depressurizing said first bed to atmosphere and ramping down the discharge pressure of said air blower and continuing removing said waste stream from said second bed with said vacuum pump; and (f) repeating steps (a) through (e) while reversing said first bed and said second bed.

2. The process as claimed in claim 1 wherein said air stream is about 21% oxygen and about 79% nitrogen.

3. The process as claimed in claim 1 wherein said adsorbent is a zeolite.

4. The process as claimed in claim 3 wherein said zeolite is a type X zeolite.

5. The process as claimed in claim 4 wherein said type X zeolite is a lithium ion-exchanged type X zeolite.

6. The process as claimed in claim 5 wherein said process is a vacuum swing adsorption process.

7. The process as claimed in claim 1 wherein said vacuum pump is a one or a two stage vacuum pump.

8. The process as claimed in claim 1 wherein said waste stream is primarily nitrogen.

9. The process as claimed in claim 1 wherein ambient air is added to said first bed in step (a).

10. The process as claimed in claim 1 wherein said second bed is being regenerated in step (a).

11. The process as claimed in claim 1 wherein said second bed is at a higher pressure than said first bed in step (a).

12. The process as claimed in claim 1 wherein the air blower discharge pressure is ramped down from 6 atmospheres to 2 atmospheres.

13. The process as claimed in claim 1 wherein said process is a vacuum swing adsorption process.

14. The process as claimed in claim 13 wherein the feed pressure is 1013 millibar or higher and the vacuum pressure is 260 millibar or higher with a cycle time of 5 to 120 seconds.

15. The process as claimed in claim 1 wherein said process is a pressure swing adsorption process.

16. The process as claimed in claim 15 wherein said feed pressure is 3 bara or less with a cycle time of between about 5 to about 60 seconds.

* * * * *